(12) United States Patent
Ulmefors et al.

(10) Patent No.: US 9,220,194 B2
(45) Date of Patent: Dec. 29, 2015

(54) FRONT MOUNTED CUTTING DECK WITH INDEPENDENTLY POSITIONABLE DECKS AND MAINTENANCE POSITION

(75) Inventors: Andreas Ulmefors, Malmö (SE); Gustav Landberg, Stockholm (SE); Rajinder Mehra, Johanneshov (SE); Daniel Carlsson, Tvååker (SE)

(73) Assignee: HUSQVARNA AB, Huskvarna (SE)

( * ) Notice: Subject to any disclaimer, the term of this patent is extended or adjusted under 35 U.S.C. 154(b) by 658 days.

(21) Appl. No.: 13/375,585

(22) PCT Filed: Jun. 1, 2009

(86) PCT No.: PCT/SE2009/050636
§ 371 (c)(1),
(2), (4) Date: Feb. 17, 2012

(87) PCT Pub. No.: WO2010/140929
PCT Pub. Date: Dec. 9, 2010

(65) Prior Publication Data
US 2012/0266580 A1    Oct. 25, 2012

(51) Int. Cl.
*A01D 34/00* (2006.01)
*A01D 34/66* (2006.01)
*A01D 34/86* (2006.01)
*A01D 34/64* (2006.01)

(52) U.S. Cl.
CPC ............ *A01D 34/662* (2013.01); *A01D 34/661* (2013.01); *A01D 34/863* (2013.01); *A01D 34/866* (2013.01); *A01D 2034/645* (2013.01)

(58) Field of Classification Search
USPC ......... 56/6, 10.4, 14.9, 15.1, 15.2, 15.5, 15.9, 56/218, 228
See application file for complete search history.

(56) References Cited

U.S. PATENT DOCUMENTS

| 2,898,725 | A | * | 8/1959 | Roesel ............................. 56/294 |
| 3,608,284 | A | * | 9/1971 | Erdman ............................. 56/6 |
| 3,797,209 | A | | 3/1974 | Davis |
| 4,563,019 | A | | 1/1986 | Kuhn et al. |
| 4,779,406 | A | * | 10/1988 | Schroeder ....................... 56/15.9 |

(Continued)

FOREIGN PATENT DOCUMENTS

| CN | 201178582 Y | 1/2009 |
| CN | 201210803 Y | 3/2009 |

(Continued)

OTHER PUBLICATIONS

International Search Report and Written Opinion of PCT/SE2009/050636 mailed Jan. 13, 2010.

(Continued)

*Primary Examiner* — Alicia Torres
(74) *Attorney, Agent, or Firm* — Nelson Mullins Riley & Scarborough LLP

(57) ABSTRACT

A lawn mower includes a seat, a front mounted cutting deck, and at least a first cutter bar enclosed in a first cutter housing rotatable about a first vertical axle and a second cutter bar enclosed in a second cutter housing rotatable about a second vertical axle. The lawn mower further includes a hinge mechanism for connecting footplates to the lawn mower, a pivot support arm for connecting a steering wheel to the lawn mower, a movable arm for lifting the lawn mower to an upright position, the first and second axles being spaced from each other by a transversal distance.

20 Claims, 4 Drawing Sheets

(56) References Cited

U.S. PATENT DOCUMENTS

| | | | |
|---|---|---|---|
| 4,916,889 A * | 4/1990 | Molstad | 56/14.9 |
| 5,079,926 A * | 1/1992 | Nicol | 56/12.7 |
| 5,146,733 A * | 9/1992 | Klaeger | 56/6 |
| 5,321,938 A * | 6/1994 | LeBlanc | 56/6 |
| 5,771,669 A | 6/1998 | Langworthy et al. | |
| 5,816,035 A | 10/1998 | Schick | |
| 6,065,274 A | 5/2000 | Laskowski et al. | |
| 6,182,428 B1 | 2/2001 | Hatfield | |
| 6,202,014 B1 * | 3/2001 | Brandt et al. | 701/50 |
| 6,341,480 B1 | 1/2002 | Dahl et al. | |
| 6,347,503 B1 | 2/2002 | Esau | |
| 6,351,929 B1 | 3/2002 | Gust et al. | |
| 6,393,815 B1 | 5/2002 | Funk et al. | |
| 6,484,481 B1 | 11/2002 | Langworthy et al. | |
| 7,089,722 B2 | 8/2006 | Laskowski | |
| 7,347,039 B2 * | 3/2008 | Koehn | 56/15.9 |
| 7,401,456 B2 * | 7/2008 | Korthals | 56/10.4 |
| 7,404,282 B2 | 7/2008 | Samejima et al. | |
| 7,437,864 B2 | 10/2008 | Link et al. | |
| 7,451,586 B1 | 11/2008 | Papke et al. | |
| 2006/0021315 A1 * | 2/2006 | Brandon | 56/14.7 |
| 2007/0084173 A1 | 4/2007 | Phillips | |

FOREIGN PATENT DOCUMENTS

| | | |
|---|---|---|
| EP | 1588602 | 10/2005 |
| FR | 2793991 | 12/2000 |
| FR | 2900023 | 10/2007 |
| JP | 06022622 | 2/1994 |
| NL | 7905005 | 6/1979 |
| WO | 2009007506 | 1/2009 |
| WO | 2010140929 A1 | 12/2010 |

OTHER PUBLICATIONS

Chapter II International Preliminary Report on Patentability mailed Sep. 6, 2011.

"Commercial Mowing Equipment," from http://www.deere.com/en_AU/brochure/cce/commercial/ztraks/DKA74_LargeFrameCommercial.pdf.

"Professional Golf & Turf Equipment," from http://www.lastec.com/products/comm/61a.html.

"Encore Prowler Mid Cut Riding Lawn Mowers," from http://www.allwebdiscounts.com/6170.php.

* cited by examiner

FRONT MOUNTED CUTTING DECK WITH INDEPENDENTLY POSITIONABLE DECKS AND MAINTENANCE POSITION

TECHNICAL FIELD

The present invention relates to lawn mowers. More particularly, it relates to cutting width adjustment, articulation and service, maintenance, and storage features of the cutting deck of a lawn mower.

BACKGROUND

Lawn mowers utilize rapidly rotating blades for cutting vegetation or grass to an even height. The blades are enclosed in a housing, which forms a part of a cutting deck assembly of the lawn mower. The cutting deck assembly can be front-mounted, rear-mounted, or mid-mounted with respect to the main lawn mower body. Front-mounted mowers are usually preferred for improved stability, maneuverability, and mowing performance.

However, lawn mowers are at times unsuited for use on severe terrain, including hills, undulations, highly sloped regions, and other irregular areas. Lawn mowers with rigid and/or fixed cutting decks are unsuitable for mowing such terrain and may lead to scalping, skipping, and streaking of grass. The cutter blades in a fixed cutting deck are unable to conform to the terrain beneath them. Consequently, small bumps or upwardly sloping regions that pass underneath the fixed cutting deck may be scalped while depressions or downwardly sloping regions may be undercut or entirely missed.

Traditionally, the aforementioned disadvantages of fixed cutting deck mowers are addressed by segmenting the relatively wide fixed cutting deck into a plurality of narrower cutter bars within the deck. Each cutter bar may carry one or more rotary cutter blades. For example, U.S. Pat. No. 7,089,722 discloses a flexible mechanism that interconnects the separate cutter bars with each other, enabling individual cutter bars to follow more closely the terrain beneath them. However, in this solution, the individual cutter bars are not able to change their height and/or orientation independent of each other in order to follow the ground contour closely. This again leads to an uneven cut on rough or undulating terrain especially where the height of the ground varies across the breadth of the mower.

Various known solutions disclose articulating cutting decks for mowing undulating terrain. However, such lawn mowers have a fixed cutting width and are inconvenient for mowing lawns with obstructions and narrow passages. Some mowers have side cutting decks that can be raised vertically and then folded to a transport position to change the cutting width or to move through confined passageways. However, the side cutting decks are inactive in the raised position, which results in redundancy and reduced flexibility.

Other known solutions include triplex trim mowers. Triplex trim mowers display variable cutting width for negotiating variable terrain. For example, U.S. Pat. No. 6,351,929 teaches laterally offset side cutting decks in a proposed triplex system for mowing around obstacles. However, such offset systems offer limited flexibility because the cutting width remains constant. Further, U.S. Pat. No. 7,437,864 discloses triplex system with variable cutting widths requiring an elaborate mechanism as both the longitudinal and lateral distances between the multiple individual cutting decks have to be changed. Furthermore, such mowers offer limited flexibility over undulating terrain because of the absence of angle or height adjustment means for individual cutting decks.

Moreover, front-mounted cutting deck assemblies require regular servicing and maintenance for removing the vegetation accumulated during the cutting process, and for cleaning and sharpening of the cutter blades. However, the underside of the cutting deck assembly is inaccessible for servicing in the operational position. The additional length of the lawn mower due to the front-mounted cutting deck assembly also poses a problem during storage in confined spaces. To solve the aforementioned problems, a tilting cutting deck assembly is usually provided for better access to the underside and for taking up less space during storage.

Various tilting deck systems have been proposed. In some proposed tilting deck systems, the cutting deck assembly needs to be manually disconnected from the main lawn mower body before it can be raised to an upright position. This results in a time consuming and tedious process for the operator. In related art, the cutting deck assembly is usually raised using an elaborate linkage mechanism, which results in an anti-clockwise rotation of the cutting deck. Since, the cutting deck in these solutions are not lifted to an upright position, auxiliary wheels are needed to support the cutting deck assembly during the tilting procedure and also in the raised position.

In available tilting deck systems, the components of the main lawn mower body such as the footplates and the steering wheel hinder the movement of the cutting deck to a completely upright position, thereby not resulting in a fully compact configuration.

Therefore, there is a need for an improved flexible cutting deck system for efficiently mowing rough terrain with obstacles and narrow passageways. Moreover, there is a need for an improved lawn mower system for providing a cutting deck position for easy serviceability and compactness for storage.

SUMMARY

In view of the above, it is an objective to solve or at least reduce the problems discussed above. In particular, an objective is to provide a lawn mower that solves the problem of maneuverability around obstacles and passage through narrow regions.

According to some embodiments, this is achieved with a variable cutting width mechanism in which a transversal distance (d) between a first vertical axle and a second vertical axle can be adjusted to increase or decrease by means of a control reachable from the operator position. The first vertical axle and the second vertical axle are the vertical axis of first and second cutter bars respectively, about which the cutter bars are operable to rotate. This leads to either a retraction or extension of the first and the second cutter bars, and thus results in passing through the narrow passages and even provides fine cutting results in passages such as those between gateposts or trees.

According to some embodiments, the cutting deck comprises a first cutter housing enclosing a first cutter bar, a second cutter housing enclosing a second cutter bar and a centre cutter housing enclosing a centre cutter bar. In an aspect of the invention, the housings provide a cover to protect the cutter bars from any foreign objects such as dust, stones etc which may restrict the operation of the lawn mower.

According to some embodiments, the first and the second cutter housings are connected to an upper portion of the centre cutter housing by means of a first support arm and a second support arm respectively. The upper portion of the centre cutter housing provide an easy slide mechanism for rotating the first support arm and the second support arm and thus provides the functionality to the first and the second cutter housings to rotate about the centre axis of the centre cutter housing either in a forward direction far retraction of the cutter housings or in a opposite direction of the forward direction for extension of the cutter housings.

According to some embodiments, the first cutter housing and the second cutter housing can adjust an angle or a height with respect to transverse centre axis of the centre cutter housing. In an aspect of the invention, the cutting deck can follow the contour of the ground more closely by changing the angle and the height.

According to some embodiments, the cutter bars derive power from a battery operated separate individual electric motors. Thereby, and also it is possible to run one cutter bar at a time and switch off the other cutter bar at the same time. Moreover, there is no need to use a drive belt for connecting the cutter bars in the cutting deck. Another advantage is that the battery operated individual electric motor can be cost effective. However, according to some embodiments, it is also possible that the cutter bars derive power from the power source of the lawn mower.

Moreover, there can be separate electric or hydraulic motors for operating the rotation of the first and second support arms on the upper portion of the centre cutter housing.

According to some embodiments, the cutting deck can be raised to an upright position by means of a movable arm connected to the chassis of the lawn mower. In an aspect of the invention, the upright position of the cutting deck assists in servicing and maintenance of the cutting deck and further assists in compact storage as well.

Another objective is to provide a lawn mower, which solves the problem of maneuverability around uneven surface or undulation in the ground contour.

According to some embodiments, this is achieved with an articulating mechanism of the cutting deck in which at least one of the support arms changes an angle and a height with respect to a transverse centre axis of the centre cutter housing to follow a contour of a ground surface. The first and the second support arms are attached to the upper portion of the centre cutter housing by a hinge mechanism and thus provides an advantage to the cutting deck to maneuver in severe terrain, including hills, undulations, highly sloped regions, and other irregular areas.

Since, the cutting deck according to some embodiments is a flexible cutting deck provided by the hinge mechanism, it is suitable for mowing uneven or severe terrain and does not lead to scalping, skipping, and streaking of grass. Moreover, the cutting deck conforms to the immediate terrain beneath each cutter blade provided in the cutting deck.

Further, according to some embodiments, the cutting deck comprises a distance sensor for measuring a distance between the cutting deck and the ground. In an aspect of the invention, the first cutter housing and the second cutter housing (13) can adjust the angle or the height with respect to the transverse centre axis of the centre cutter housing based on the signal received from the distance sensor. Moreover, there can be precise adjustment of the height and angle based on the signals received from the distance sensor.

According to some embodiments, a cutting width of the cutting deck can be adjusted to accommodate the narrow areas such as gateposts and trees etc. Further, the cutting deck can also be raised to an upright position, according to some embodiments. The upright position assists in service and maintenance of the cutting deck and further helps in compact storage of the lawn mower.

Another objective is to provide a lawn mower, which allows for convenience in serviceability and compactness in storage.

According to some embodiments, this is achieved with a tilting cutting deck mechanism in which the footplates fold up towards the lawn mower by means of the hinge mechanism and the steering wheel rotates towards the seat for the operator position by means of the pivot support arm, to allow the cutting deck to attain the upright position. The footplates are connected to a lower structure of the lawn mower to assist the feet of the operator during operation of the lawn mower. Since, the footplates are connected to the lawn mower by means of a hinge mechanism, it does not obstruct the lifting of the cutting deck. In one advantageous feature, the cutting deck may push the footplates towards the lawn mower and there is no need of an alternate mechanical or electric means to fold up the footplates.

Further, the steering wheel also rotates towards the seat of the operator during the lifting of the cutting deck to the upright position. This feature provides an advantage that the steering wheel does not obstruct the movement of the cutting deck to attain a complete upright position. Moreover, in the upright position, the cutting deck attains a stable position by itself and does not require any locking mechanism as the centre of gravity of the cutting deck is behind the turning point of the cutting deck.

According to some embodiments, the movable arm derives power from a separate electric motor. This provides the advantage of separately operating the movable arm without compromising on other operations of the lawn mower. Moreover, according to claim 14, it is also possible to utilize the power source of the lawn mower to lift the cutting deck.

According to some embodiments, the seat of the operator comprises an operator presence sensor. The presence sensor is operable to send a signal based on the occupancy of the seat. In an aspect of the invention, the operator may provide an input, by means of the control panel, to raise the cutting deck to an upright position. However, the seat will only be lifted if the control panel receives a signal from the operator presence sensor that the seat is unoccupied. The control panel may actuate the movable arm to lift the cutting deck after receiving the signal from the operator presence sensor. Since, the cutting deck is not allowed to be lifted until the seat is unoccupied, accidental chances of any sudden lifting of cutting deck during operations are avoided.

Moreover, since the cutting deck can achieve an upright position, it can easily be stored in smaller place as compared to the space required when the cutting deck is in operational position. Further, it is easier to service or perform maintenance processes on the cutting deck when it is in the upright position.

Further, according to some embodiments, a cutting width of the cutting deck can be adjusted to accommodate the narrow areas such as gateposts etc. Moreover, according to some embodiments, the first cutter housing and the second cutter housing can adjust an angle or a height with respect to transverse centre axis of the centre cutter housing. In an aspect of the invention, the cutting deck can follow the contour of the ground more closely by changing the angle and the height.

BRIEF DESCRIPTION OF THE DRAWINGS

The invention will in the following be described in more detail with reference to the enclosed drawings, wherein.

DESCRIPTION OF EMBODIMENTS

Figure 1:
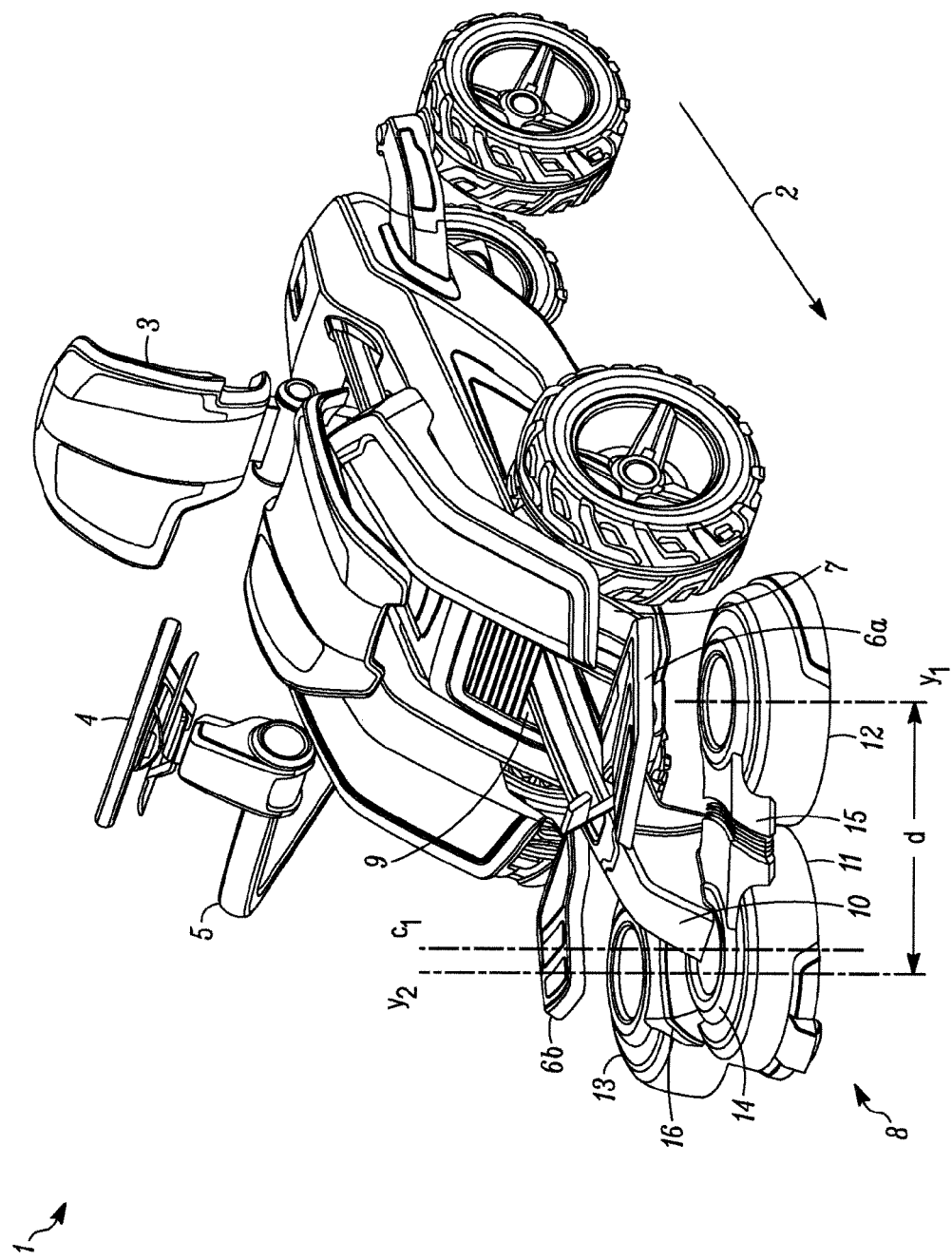
FIG. 1 shows a perspective view of a lawn mower, according to an embodiment of the present invention.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

FIG. 1 shows a perspective view of a lawn mower 1, according to an embodiment of the present invention. In an embodiment of the present invention, the lawn mower 1 is a ride-on lawn mower 1 that moves in a forward direction 2 during operation. The lawn mower 1 comprises a seat 3 for an operator position to maneuver the lawn mower 1. The operator may have access to an operation panel (not shown in the figure). The operation panel may include various handles, knobs, buttons etc. for controlling various functions of the lawn mower 1. The lawn mower 1 further comprises a steering wheel 4, which is connected to the lawn mower 1 by means of a pivot support arm 5. The lawn mower also comprises footplates 6a-6b, which are hinged to a lower structure 7 of the lawn mower 1. The footplates 6a-6b in the lowered position support the feet of an operator during operation of the lawn mower 1. Other components suitable for the operation of the lawn mower 1 such as various handles, knobs, pedals, and the like have been omitted for the sake of clarity. In an embodiment of the present invention, the lawn mower 1 has two electric drive motors (not shown in the figure), one in each drive wheel (front wheels) and a battery in the rear portion of the lawn mower 1. The battery is rechargeable by plug in of the lawn mower 1 via electric cord.

The lawn mower 1 further comprises a front mounted cutting deck 8. The cutting deck 8 is utilized for cutting grass or any other unwanted material in a lawn. The cutting deck 8 is connected to a chassis 9 of the lawn mower 1 by means of a movable arm 10. The term cutting deck 8 is intended to mean the whole unit, which is connected to the movable arm 10 in front of the lawn mower 1. The whole unit includes the whole casing with at least two or more cutter bars/knives, cutter housings for each of the cutter bars, pivot wheels or distance sensors included in the cutter/knives housings and/or cutting deck, cutting height adjustment mechanism and so on.

As shown in the FIG. 1, the cutting deck 8 of the present invention comprises three housings: a centre cutter housing 11 enclosing a centre cutter bar, a first cutter housing 12 enclosing a first cutter bar and a second cutter housing 13 enclosing a second cutter bar. The housings are sometimes also referred as domes or doughnuts. A person skilled in the art may acknowledge that there are no limitations on the number of housings or the cutter bars enclosed in a housing, and the case shown in the present invention is merely for illustration purposes and does not limit the scope of the invention. In an embodiment of the present invention, each of the cutter bars in centre cutter housing 11, first cutter housing 12 and the second cutter housing 13 is operated by individual electric motors. In a further embodiment of the present invention, the individual electric motors are either battery operated or derive power from the power source operating the lawn mower 1. For the sake of clarity batteries, motors, cutter bars etc. have been omitted from the figures.

The centre cutter housing 11 is connected to the lawn mower 1 by means of the movable arm 10. Further, the first cutter housing 12 and the second cutter housing 13 are each connected to an upper portion 14 of the centre cutter housing 11 by means of a first support arm 15 and a second support arm 16 respectively. The cutter bars in the cutter housings are generally rotary cutter bars. For example, the first cutter bar in the first cutter housing 12 and the second cutter bar in the second cutter housing 13 are rotary cutter bars and are rotatable about a first vertical axle (Y1) and a second vertical axle (Y2). As shown in the FIG. 1, the first vertical axle (Y1) and the second vertical axle (Y2) are spaced from each other by a transversal distance (d). The transversal distance (d) is measured in a transversal direction perpendicular to the forward direction 2 of the lawn mower. The cutting width of the cutting deck 8 is dependent on the transversal distance (d). Precisely, the cutting width is:

$$\text{Cutting width} = d + a/2 + a/2 = d + a,$$

where, 'a' is the length of a cutter bar.

Further, the first cutter housing 12 is operable to rotate around the centre cutter housing 11 about a central axis (C1), which is the centre vertical axis (C1) of the centre cutter housing 11. Similarly, the second cutter housing 13 is operable to rotate around the centre cutter housing 11 about the central axis (C1). Since, the first cutter housing and the second cutter housing 13 are rotatable about the centre axis (C1), the distance between the centers of the 'first cutter housing 12' and of the 'centre cutter housing 11' remains constant. Similarly, the distance between the centers of the 'second cutter housing 13; and of the 'centre cutter housing 11' remains constant. In an embodiment of the present invention, the first cutter housing 12 and the second cutter housing 13 may rotate on the upper portion 14 of the centre cutter housing 11 by means of the first support arm 15 and the second support arm 16 respectively.

In an aspect of the present invention, the operator may adjust the transversal distance (d), as per the need to retract or extend the first cutter housing 12 enclosing the first cutter bar and the second cutter housing 13 enclosing the second cutter bar. For example, in case of narrow passages such as gateposts or trees etc, the operator may decrease the transversal distance (d) by retracting either one or both of the first cutter housing 12 and the second cutter housing 13.

Figure 2:
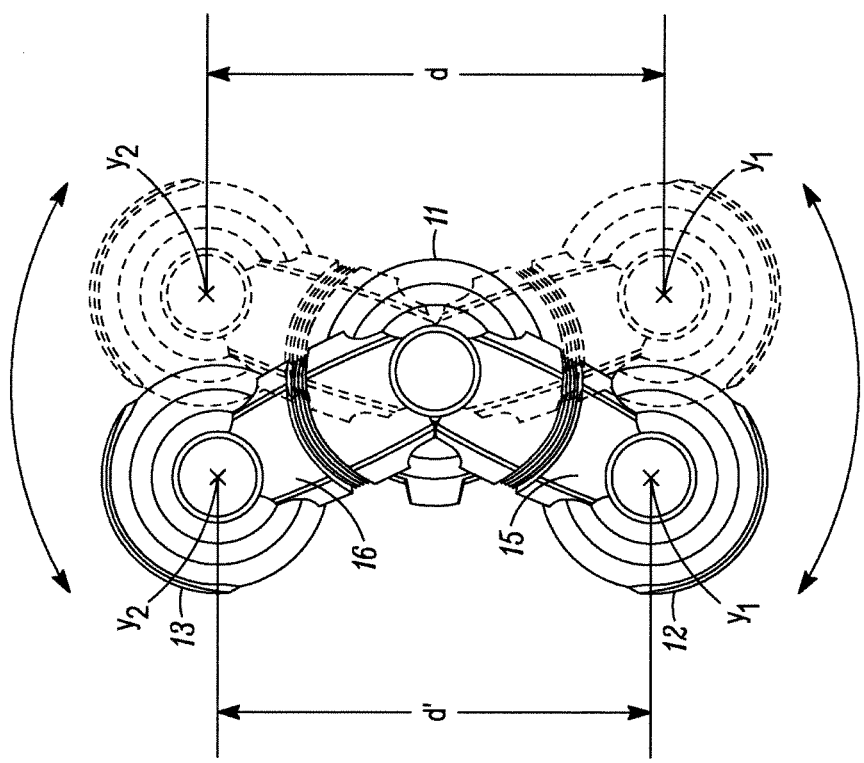
FIG. 2 shows a top view of a cutting deck in a retracted position, according to an embodiment of the present invention.

FIG. 2 shows a top view of the cutter deck 8 in a retracted position (shown by arrows), according to an embodiment of the present invention. As shown in the FIG. 2, the transversal distance (d) is decreased to (d') due to retraction of the first cutter housing 12 and the second cutter housing 13. In an embodiment of the present invention, the transversal distance (d) is reduced to (d'), when the first cutter housing 12 and the second cutter housing 13 rotates on the upper portion 14 of the centre cutter housing 11 in the forward direction 2, by means of the first support arm 15 and the second support arm 16 respectively. In another embodiment of the present invention, the transversal distance (d) may increase on extension of the first cutter housing 12 and the second cutter housing 13 in a direction opposite to the forward direction 2 of the lawn mower 1.

In an embodiment of the present invention, the cutting deck 3 may be configured in a manner so that both the first cutter housing 12 and the second cutter housing 13 are shifted to move between a retracted position and an extended position. In this embodiment, the center cutter housing 11 may remain stationary while the first cutter housing 12 and the second cutter housing 13 move between the retracted and extended positions. In a further embodiment of the present invention, the first cutter housing 12 and the second cutter housing 13 may be selectively shifted to one or more intermediate positions between the retracted and the independent positions. Moreover, the first cutter housing 12 and the second cutter housing 13 are independently retractable and extendable.

In an embodiment of the present invention, the operator may utilize the control panel, which includes various buttons and/or knobs present in the operation panel to retract or extend the position of the cutter housings 12 and 13. In a further embodiment of the invention, the operator may manually perform the retraction or extension of the cutter housings 12 or 13 with the help of a lever or the like. Moreover, the same controls may be used to shift both the first and the second cutter housings between the retracted and extended positions. In one embodiment of the present invention, there are separate individual electric or hydraulic motors (not shown in the figure) for rotating the first support arm 15 and the second support arm 16 on the upper portion 14 of the centre cutter housing 11.

In an embodiment of the invention, the first cutter housing 12 and the second cutter housing 13 may be shifted between the retracted and extended positions while continuing the operation of the lawn mower 1; i.e., without shutting off the operation of the cutting deck 8.

Figure 3:
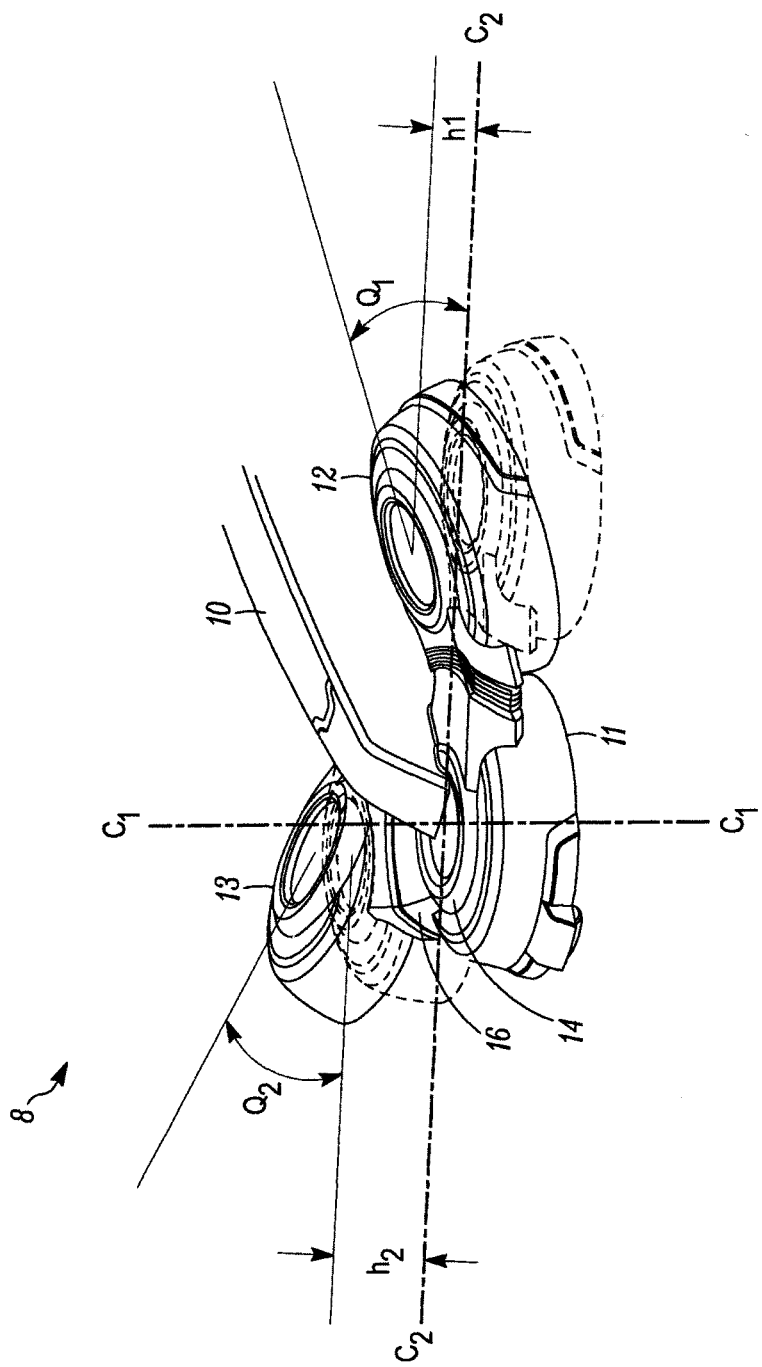
FIG. 3 shows a perspective view of the cutting deck in an articulated position, according to an embodiment of the present invention.

FIG. 3 shows a perspective view of the cutting deck 8 in an articulated position, according to an embodiment of the present invention. As shown in the previous FIG. 1, the first cutter housing 12 and the second cutter housing 13 are connected to the centre cutter housing 11 by means of the first support arm 15 and the second support arm 16. In an embodiment of the present invention, the first support arm 15 is hinged at the upper portion 14 of the centre cutter housing 11. Similarly, the second support arm 16 is also hinged at the upper portion 14 of the centre cutter housing 11. In an aspect of the present invention, the hinged position of the first support arm 15 and the second support arm 16 provides the functionality to the first cutter housing 12 and the second cutter housing 13 to change an angle and a height with respect to the transverse centre axis (C2) of the centre cutter housing 11 to follow the contour of the ground more closely. As shown in the FIG. 3, the first cutter housing 12 may be raised to a height 'h1' from the transverse centre axis (C2) of the centre cutter housing 11. Moreover, the first cutter housing 12 attains an angle 'Q1' to follow the contour of the ground. Similarly, the second cutter housing 13 is shown at a height of 'h2' and angle 'Q2'.

In an embodiment of the present invention, to provide a desired positioning of the first and the second cutter housings 12 and 13 relative to the ground, the first and the second cutter housings 12 and 13 each ride at least partially on wheels, which roll over the ground. Moreover, each of the first cutter housing 12 and the second cutter housing 13 is pivotally hinged at one more location on the center cutter housing 11 coaxially to the hinge location of the first and the second support arms 15 and 16. Further, the first and the second cutter housings 12 and 13 are also supported along the ground at one point near their outer edge. The two hinge locations in addition to the support at the outer edge, form a three point support for each of the first and the second cutter housings 12 and 13. Since the three points define a plane, the first and the second cutter housings 12 and 13 are properly supported on the ground and are free to closely follow the contour of the ground, which is especially useful on uneven grounds with ridges and depressions and also on slopes.

In an embodiment of the present invention, the cutting deck 8 may have distance sensors (not shown) such as, but not limited to, lasers for measuring the distance between the cutting deck 8 and the ground. Thus, the height and the angle can be adjusted for each of the first cutter housing 12 and the second cutter housing 13 based on the readings or signals received from the distance sensors.

A person of ordinary skill in the art may acknowledge that the embodiment of articulation of the housings enclosing the cutter blades is attained without adversely affecting the cut accomplished by the first and the second cutter bars. It will be apparent that the first and the second cutter housings 12 and 13 are positioned so that there is significant overlap of cutting as the lawn mower 1 is moved in its forward direction 2. Moreover, there is also sufficient overlap of cutting to avoid gaps in the cutting when the lawn mower 1 turns in either direction.

Figure 4:
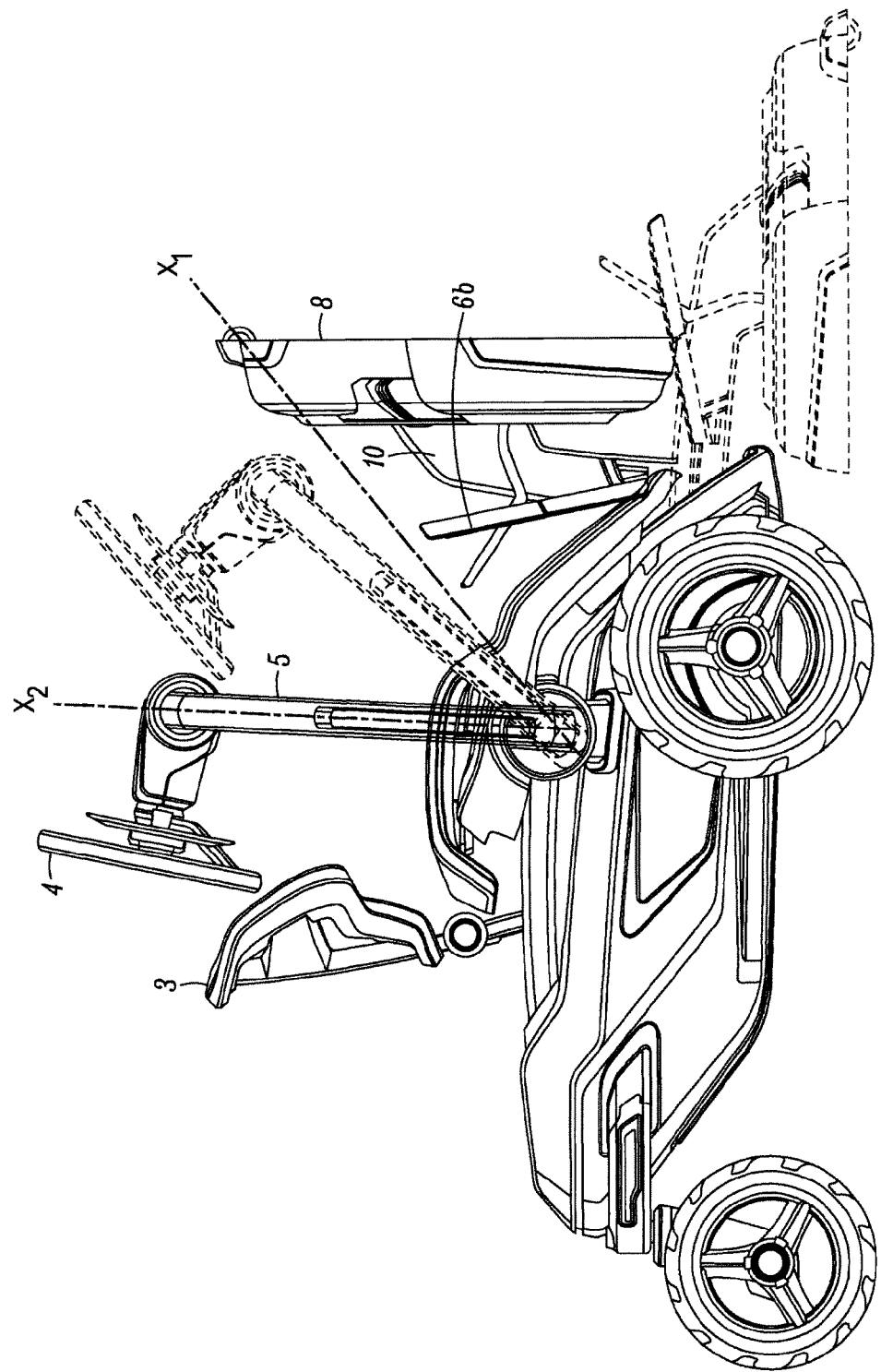
FIG. 4 shows a side view of the cutting deck in an upright position, according to an embodiment of the present invention.

FIG. 4 is a side view of the cutting deck 8 in an upright position, according to an embodiment of the present invention. As shown in the previous FIG. 1, the first cutter housing 12 and the second cutter housing 13 and the center cutter housing 11 are connected to the chassis 9 of the lawn mower 1 by means of the movable arm 10. Moreover, the lawn mower 1 comprises footplates 6a-6b that are hinged to the lower structure 7 of the lawn mower 1. Further the lawn mower 1 comprises the steering wheel 4, which is connected to the body of the lawn mower 1, by means of a pivot support arm 5. Since, the cutting deck requires service and maintenance, it is desirable to lift the cutting deck to a position, which is easily accessible for servicing.

As shown in the FIG. 4, the movable arm 10 lifts the cutting deck 8 to an upright position. In an aspect of the present invention, when the lifting begins, the cutting deck 8 may force the hinged footplates 6a-6b to fold up by contact towards the lower structure 7 of the lawn mower 1. In an embodiment of the present invention, there may be a mechanical connection such as an arm, a rod or a rope, through which the hinged footplates 6a-6b are folded up. The cutting deck 8 may take any position between the operational position and the upright position. In an embodiment of the present invention, a mechanical lock or a latch mechanism is provided to hold the cutting deck at any position between the operating position and the upright position.

In another aspect of the present invention, to provide a complete upright position to the cutting deck 8, the steering wheel 4 also rotates away by means of the pivot support arm 5. The pivot support arm 5 makes the steering wheel 4 rotate towards the seat 3 for the operator position. As shown in the FIG. 4, the steering wheel 4 moves from a position X1 to a position X2, (a ghost image is shown in the figure to depict the movement of the steering wheel 4) i.e. towards the seat 3 of the lawn mower 1, to allow the cutting deck 8 to attain the complete upright position.

In case of an upright position, no other locking mechanism is required as in this case the centre of gravity of the cutting deck 8 is located behind the turning point of the cutting deck 8. In this upright position, the cutting deck 8 can be easily cleaned, repaired, or the like. Moreover, the upright position of the cutting deck 8 also helps in convenient transport or storage, as the cutting deck 8 may take less space in an upright position as compared to an operational position or any other position intermediate between the operational position and the upright position.

In an embodiment of the present invention, there may be a separate electric motor (not shown in the FIG) to power the movable arm to lift the cutting deck 8 to an upright position. In another embodiment of the invention, the movable arm 10 may derive the power to lift the cutting deck 8 from the power source of the lawn mower 1. Also, the same controls can be used for lifting of both the cutting deck 8, folding of foot-plates 6a-6b and rotating the steering wheel 4 towards the seat 3.

In an embodiment of the present invention, the seat 3 for the operator position may comprise an operator presence sensor (not shown in the figure). In one aspect of the invention, the operator may provide an input to the control panel to lift the cutting deck assembly 8 to an upright position. The control panel then checks if it has received a signal from the operator presence sensor about the occupancy status of the seat 3. In case the seat 3 is unoccupied, the control panel actuates the movable arm 10 to lift the cutting deck 8 to an upright position.

In the drawings and specification, there have been disclosed preferred embodiments and examples of the invention and, although specific terms are employed, they are used in a generic and descriptive sense only and not for the purpose of limitation, the scope of the invention being set forth in the following claims.

Parts List

Lawn Mower 1
Forward direction of lawn Mower 2
Seat 3
Steering Wheel 4
Pivot support arm 5
Foot Plates 6a-6b
Lower structure 7
Cutting deck 8
Chassis 9
Movable arm 10
Central cutting bar 11
Centre axis (C1)
Transverse Centre axis (C2)
First cutting bar 12
First vertical axle (Y1)
Second cutting bar 13
Second vertical axle (Y2)
Upper portion of the centre cutting bar 14
First support arm 15
Second support arm 16

The invention claimed is:

1. A ride-on lawn mower comprising:
a vehicle frame coupled to at least two wheels and configured to support an operator in an operator position;
a front-mounted cutting deck comprising a first cutting blade housed in a first cutter housing and arranged for rotation about a first vertical axle, a second cutting blade housed in a second cutter housing and arranged for rotation about a second vertical axle, and a third cutting blade housed in a third cutter housing and arranged for rotation about a third vertical axle;
a first electric motor coupled to the first cutting blade to drive rotation of the first cutting blade;
a second electric motor coupled to the second cutting blade to drive rotation of the second cutting blade; and
a movable arm coupling the front-mounted cutting deck to the vehicle frame, wherein the movable arm is operably coupled to only the third cutting housing of the first, second, and third cutting housings of the front-mounted cutting deck,
wherein the first vertical axle and the second vertical axle are spaced apart from each other by a transversal distance measured perpendicular to a longitudinal axis of the ride-on lawn mower,
wherein the first cutter housing is rotatably coupled relative to the movable arm via a first support arm to enable rotation of the first cutter housing in a plane, the first support arm being pivotally hinged relative to the third cutter housing to enable movement of the first cutter housing out of the plane,
wherein the second cutter housing is rotatably coupled relative to the movable arm via a second support arm to enable rotation of the second cutter housing in the plane, the second support arm being pivotally hinged relative to the third cutter housing to enable movement of the second cutter housing out of the plane,
wherein the first vertical axle and the second vertical axle are coupled to the movable arm such that the transversal distance between the first vertical axle and the second vertical axle can be adjusted by the operator to increase or decrease,
wherein the front-mounted cutting deck is raisable to a substantially upright position via the movable arm to assist with servicing or storage of the cutting deck, and
wherein the first electric motor and the second electric motor move with the first vertical axle and the second vertical axle, respectively, when the transversal distance is increased or decreased.

2. The ride-on lawn mower of claim 1, further comprising:
a control reachable from the operator position,
wherein the transversal distance between the first vertical axle and the second vertical axle can be adjusted by the operator to increase or decrease via the control or the cutting deck is raisable by the operator to the substantially upright position via the control.

3. The ride-on lawn mower of claim 1,
wherein the third vertical axle is positioned forward of the first and second vertical axles, and
wherein the first vertical axle and the second vertical axle are coupled to the third vertical axle so that they can both be rotated rearward in an arc around the third vertical axle to decrease the transversal distance between the first vertical axle and the second vertical axle.

4. The ride-on lawn mower of claim 3, wherein the first and second cutting blades can adjust an angle or a height relative to the third cutting blade.

5. The ride-on lawn mower of claim 1, further comprising:
at least one footplate for supporting at least one foot of the operator,
wherein the front-mounted cutting deck is raisable to a substantially upright position by means of the movable arm to assist with servicing or storage of the cutting deck, and
wherein the at least one footplate is foldable to allow the cutting deck to attain a substantially upright position.

6. The ride-on lawn mower of claim 1, further comprising:
a steering assembly moveably coupled to the vehicle frame,
wherein the steering assembly is moveable relative to the vehicle frame to allow the cutting deck to attain a substantially upright position.

7. A ride-on lawn mower comprising:
a vehicle frame coupled to at least two wheels and configured to support an operator in an operator position;
a front-mounted cutting deck coupled to the vehicle frame by a movable arm, the front-mounted cutting deck comprising:
    a first cutting blade housed in a first cutter housing and arranged for rotation about a first vertical axle;
    a second cutting blade housed in a second cutter housing and arranged for rotation about a second vertical axle;
    a third cutting blade housed in a third cutter housing and arranged for rotation about a third vertical axle;
    a first electric motor coupled to the first cutting blade to drive rotation of the first cutting blade;
    a second electric motor coupled to the second cutting blade to drive rotation of the second cutting blade; and
    a third electric motor coupled to the third cutting blade to drive rotation of the third cutting blade,
    wherein the movable arm is operably coupled to only the third cutting housing of the first, second, and third cutting housings of the front-mounted cutting deck,
    wherein the first vertical axle and the second vertical axle are spaced apart from each other by a transversal distance measured perpendicular to a longitudinal axis of the ride-on lawn mower,
    wherein the first vertical axle and the second vertical axle are coupled to the vehicle frame such that the transversal distance between the first vertical axle and the second vertical axle can be adjusted to increase or decrease,
    wherein the first electric motor and the second electric motor move with the first vertical axle and the second vertical axle, respectively, when the transversal distance is increased or decreased,
    wherein the first cutter housing is rotatably coupled relative to the movable arm via a first support arm to enable rotation of the first cutter housing in a plane, the first support arm being pivotally hinged relative to the third cutter housing to enable movement of the first cutter housing out of the plane, and
    wherein the second cutter housing is rotatably coupled relative to the movable arm via a second support arm to enable rotation of the second cutter housing in the plane, the second support arm being pivotally hinged relative to the third cutter housing to enable movement of the second cutter housing out of the plane.

8. The ride-on lawn mower of claim 7, further comprising:
a control reachable from the operator position,
wherein the transversal distance between the first vertical axle and the second vertical axle can be adjusted by the operator to increase or decrease via the control.

9. The ride-on lawn mower of claim 7,
wherein the third vertical axle is positioned forward of the first and second vertical axles, and
wherein the first vertical axle and the second vertical axle are coupled to the third vertical axle so that they can both be rotated rearward in an arc around the third vertical axle to decrease the transversal distance between the first vertical axle and the second vertical axle.

10. The ride-on lawn mower of claim 9, wherein the first and second cutting blades can adjust an angle or a height relative to the third cutting blade.

11. A ride-on lawn mower comprising:
a vehicle frame coupled to at least two wheels and configured to support an operator in an operator position;
a control reachable from the operator position; and
a front-mounted cutting deck coupled to the vehicle frame by a movable arm, the front-mounted cutting deck comprising:
    a first cutting blade arranged for rotation within a first blade housing portion about a first vertical axle;
    a second cutting blade arranged for rotation within a second blade housing portion about a second vertical axle;
    a third cutting blade arranged for rotation within a third blade housing portion about a third vertical axle;
    wherein the movable arm is operably coupled to only the third cutting housings of the first, second, and third cutting housings of the front-mounted cutting deck,
    wherein the first vertical axle and the second vertical axle are spaced apart from each other by a transversal distance measured perpendicular to a longitudinal axis of the ride-on lawn mower,
    wherein the third vertical axle is positioned forward of the first and second vertical axles,
    wherein the first vertical axle and the second vertical axle are rotatably coupled relative to the third vertical axle so that they can both be rotated in a plane rearward in an arc around the third vertical axle to decrease the transversal distance between the first vertical axle and the second vertical axle,
    wherein the first blade housing portion is rotatably coupled relative to the third vertical axle via a first support arm, the first support arm being pivotally hinged relative to the third blade housing portion to enable movement of the first blade housing portion out of the plane,
    wherein the second blade housing portion is rotatably coupled relative to the third vertical axle via a second support arm, the second support arm being pivotally hinged relative to the third blade housing portion to enable movement of the second blade housing portion out of the plane, and
    wherein the transversal distance between the first vertical axle and the second vertical axle can be adjusted by the operator to increase or decrease via the control.

12. The ride-on lawn mower of claim 11, wherein the first and second blade housing portions adjust an angle or a height relative to the third blade housing portion.

13. The ride-on lawn mower of claim 11, further comprising:
a first electric motor coupled to the first cutting blade to drive rotation of the first cutting blade;
a second electric motor coupled to the second cutting blade to drive rotation of the second cutting blade,
wherein the first electric motor and the second electric motor move with the first vertical axle and the second vertical axle, respectively, when the transversal distance is increased or decreased.

14. The ride-on lawn mower of claim 1, further comprising:
an operator presence sensor for detecting presence of the operator in the operator position,
wherein the movable arm lifts the cutting deck or prevents the cutting deck from being lifted based at least in part on a state of the operator presence sensor.

15. The ride-on lawn mower of claim 4, further comprising:
a distance sensor for measuring a distance between the cutting deck and the ground,
wherein the height or the angle of each of the first cutter housing and the second cutter housing is adjustable based on the signals received from the distance sensor.

16. The ride-on lawn mower of claim 7, further comprising:
- an operator presence sensor for detecting presence of the operator in the operator position,
- wherein the movable arm lifts the cutting deck or prevents the cutting deck from being lifted based at least in part on a state of the operator presence sensor.

17. The ride-on lawn mower of claim 10, further comprising:
- a distance sensor for measuring a distance between the cutting deck and the ground,
- wherein the height or the angle of each of the first cutter housing and the second cutter housing is adjustable based on the signals received from the distance sensor.

18. The ride-on lawn mower of claim 11, further comprising:
- an operator presence sensor for detecting presence of the operator in the operator position,
- wherein the movable arm lifts the cutting deck or prevents the cutting deck from being lifted based at least in part on a state of the operator presence sensor.

19. The ride-on lawn mower of claim 7, wherein adjusting the traversal distance between the first vertical axle and second vertical axle comprises the first vertical axle and second vertical axle rotating about the third vertical axle.

20. The ride on lawn mower of claim 7, wherein the first vertical axle and second vertical axle are configured to rotate forward and rearward of the third vertical axle.

* * * * *